Patented Aug. 2, 1932

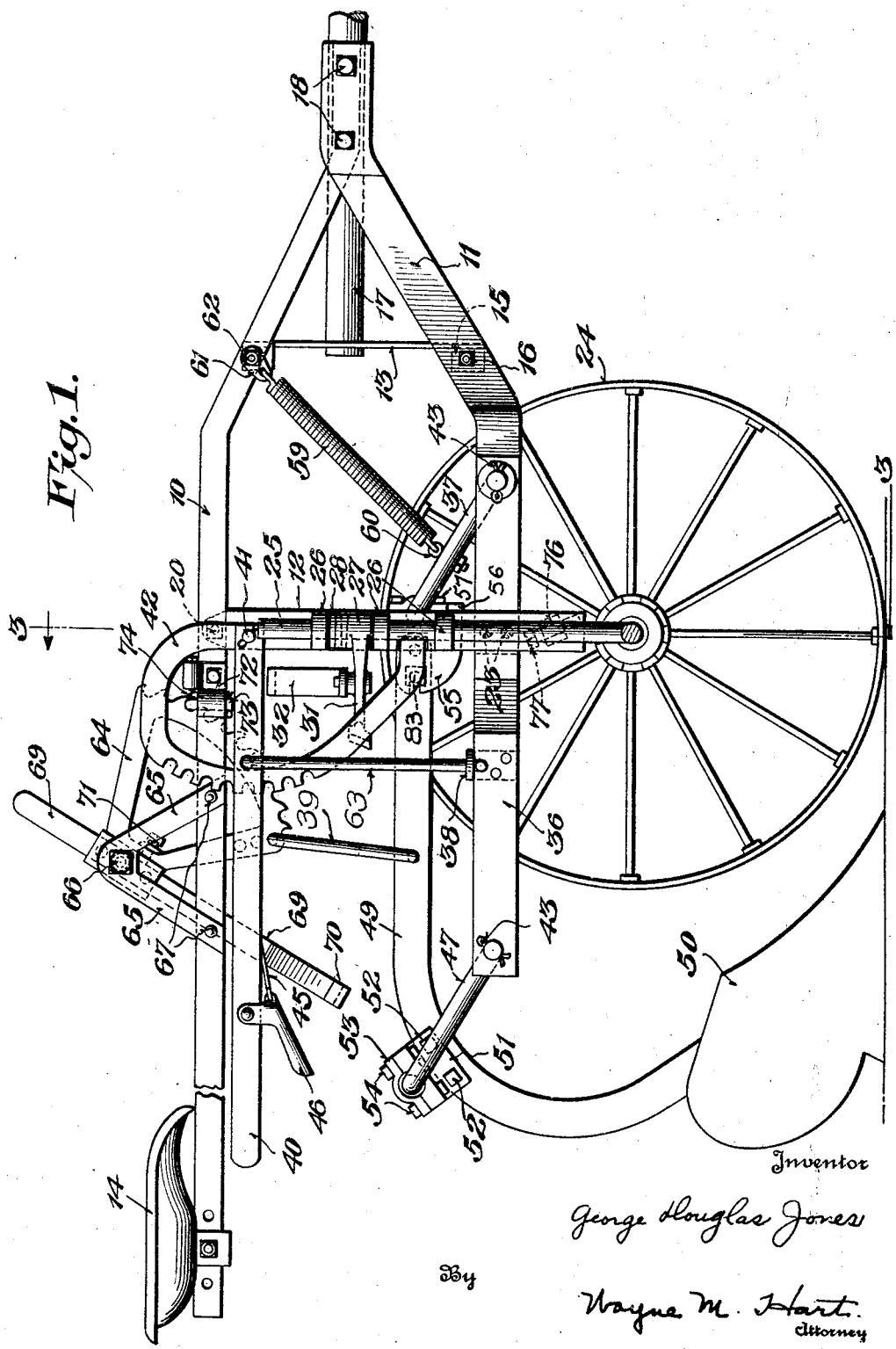

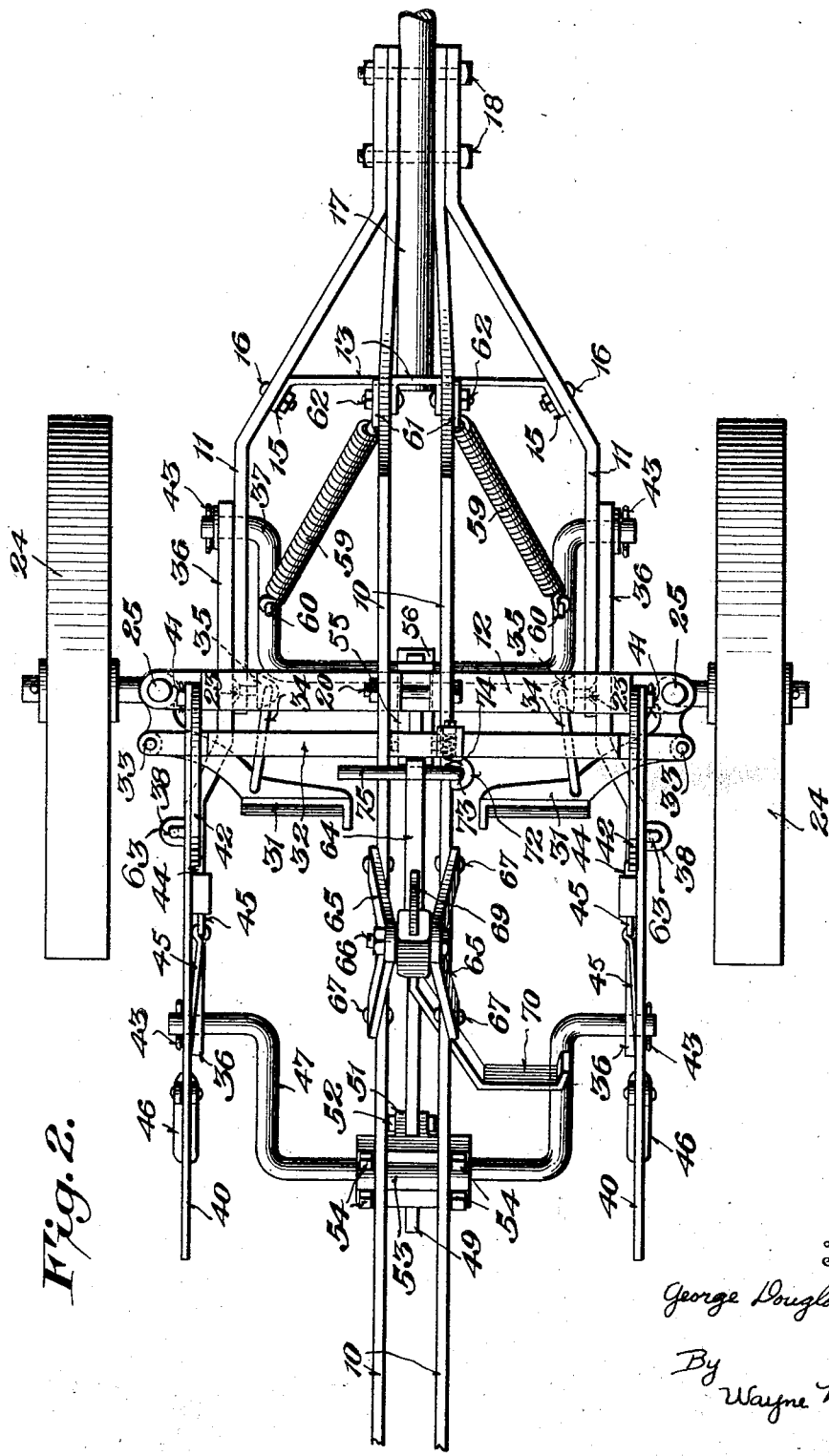

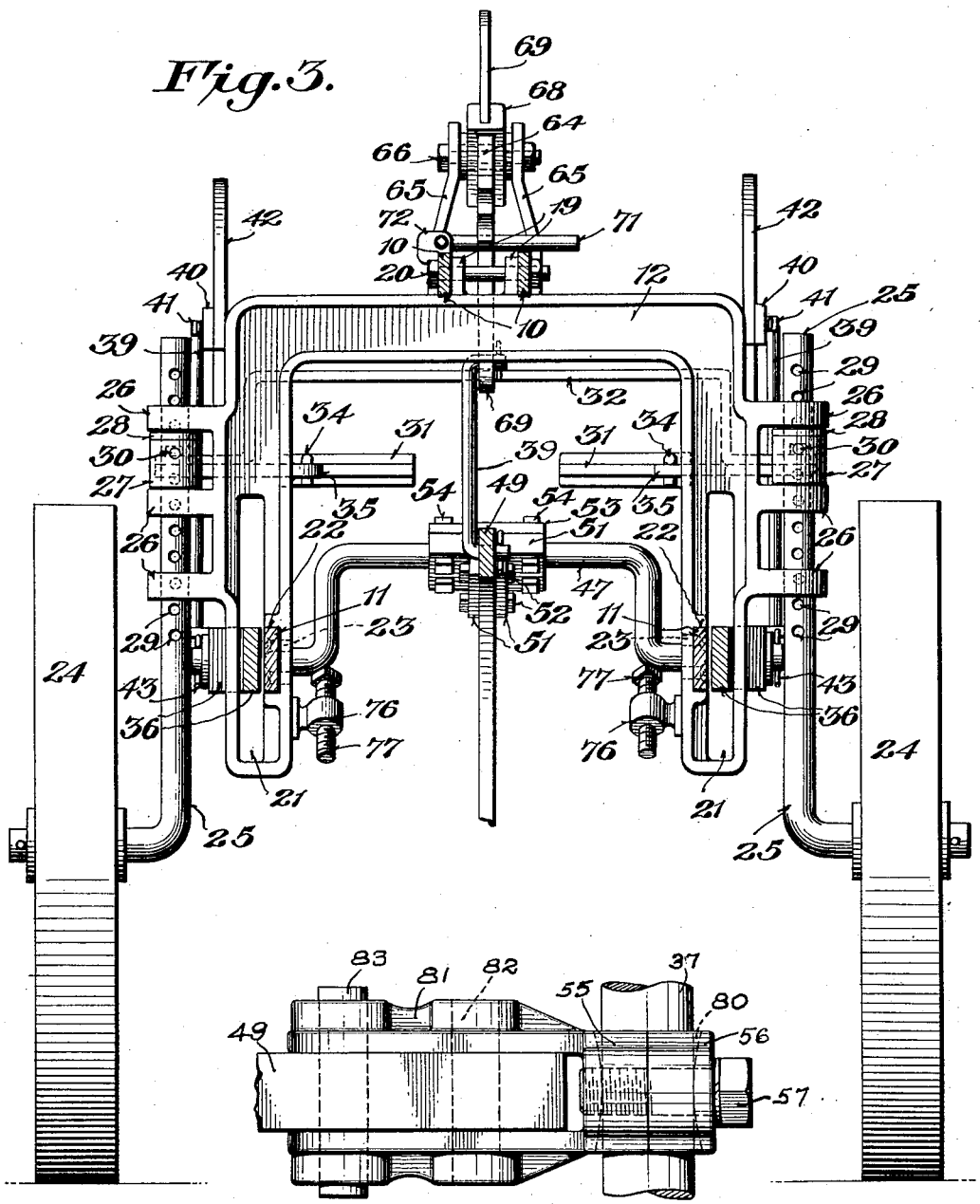

1,869,376

UNITED STATES PATENT OFFICE

GEORGE DOUGLAS JONES, OF CLEVELAND, OHIO, ASSIGNOR TO THE CLEVELAND TRACTOR COMPANY, OF CLEVELAND, OHIO

IMPLEMENT

Application filed April 4, 1929. Serial No. 352,428.

Implements are provided with a plurality of adjustments to locate the tool in the proper ground relation in order to produce desired results in varying soil conditions. At the present time the implement frame can be bodily raised or lowered relative to the supporting wheels to engage or disengage the implement tool from the ground either manually or by lifting means operated by the wheels or by a power device, vertical tilting of the ground working tool to vary the suck can be obtained by manual adjustment and setting of the tool relative to the frame, and side tilting of the tool to change the wing angle can be obtained through manually tilting the frame bodily relative to the wheels except when the tool is a gang cultivator and then the adjustment is through elevation of one gang relative to another.

In order to change the vertical tilting relation of the tool with the ground, it is now customary to stop and manually change the relation of the tool to the frame or to tilt the frame relative to the wheels. In order to change the relation of the tool wing to the ground, the frame must be tilted sideways relative to the wheels. Such manual adjustment requires unnecessary time and effort on the part of the operator. With the present types of mechanism for engaging or disengaging the tools from the ground, the mechanism is such that the tool will be entirely elevated from the ground or dropped for full depth operation and under these circumstances as there is no way to quickly relieve the load causing severe strain upon the propelling means and the implement structure generally.

An object of my invention is to provide an implement structure which is manually adjustable in a manner which overcomes the above pointed out difficulties.

Another object of my invention is to provide an implement carrier or frame structure to which several forms of earth working tools can be attached and readily adjusted in desired relation to the ground.

A further object of my invention is to provide an implement frame which can be readily adjusted manually to place the tool carried thereby in any position required relative to the ground.

Still another object of my invention is to provide an implement structure in which the tool can be readily adjusted in its ground relation without changing the relation of the frame with the supporting wheels.

Another object of my invention is to provide an implement structure in which the tool wing angle can be readily changed without affecting the position of the implement frame.

Another object of the invention is to provide an implement structure in which the tool suck can be varied while in operation.

Another object of the invention is to provide an implement structure in which the tool suck can be varied without changing the working depth thereof.

Another object of my invention is to provide an implement structure in which the working depth of the tool can be varied without changing the position of the frame.

A further object of my invention is to provide an implement structure in which a tool carrying member can be oscillated sideways relative to the supporting frame.

A still further object of the invention is to provide an implement structure in which the tool can be bodily adjusted vertically without varying the relation of the sole with the ground.

Another object of the invention is to provide an implement structure in which the tool can be adjusted vertically without varying either the wing or the sole angle.

A further object of the invention is to provide an implement structure in which the tool can be adjusted vertically without disturbing the angle of the wing.

Still another object of my invention is to provide an implement structure in which the tool can be readily positioned and secured in any desired working relation with the ground without disturbing the position of the frame relative to either the ground or the supporting wheels.

Other objects of the invention more or less ancillary or incidental to the foregoing will appear from the following description taken in connection with the drawings.

In the drawings, Fig. I is a side elevation of an implement incorporating my invention.

Fig. 2 is a plan view of the implement.

Fig. 3 is a sectional view of the implement taken on line 3—3 of Fig. I.

Fig. 4 is a fragmentary plan view showing the connection between the front bail and the forward end of the tool.

Referring now to the drawings by characters of reference, the implement frame consists of a pair of upper beams 10, a pair of lower beams 11, an arch member 12 and a bulkhead 13. The upper beams are parallel and arranged in close relation for supporting lifting mechanism and the operator's seat 14. The lower beams are arranged to extend parallel at their rear ends in widely spaced relation, while the forward ends thereof converge and overlap the forward ends of the upper beams. The lower beams support the tool carrying mechanism. The bulkhead extends transversely adjacent the forward end of the frame and is provided with flanges 15 which are rigidly secured to the upper and lower beams by the bolts 16, or some similar securing means. A drawbar 17 extends between the overlapping forward ends of the upper and lower beams and through an opening in the bulkhead, the drawbar and beams being secured rigidly together by bolts 18. The arch member 12 is preferably formed as a casting and is provided on top with a pair of spaced bosses 19 adjacent which the upper beams extend and are rigidly secured by bolts 20. The depending legs of the arch member 12 are each formed with a vertical slot 21 and a recess 22 extending therefrom to receive the rear end of the lower frame beams which are rigidly secured to the arch member legs by the screws 23, the heads of which are countersunk in the beams.

The implement frame described forms a rigid structure and is supported above the ground by a pair of wheels 24, one on each side of the arch member. A stub axle 25 extends through the hub of each supporting wheel and also through vertically aligned bearing members 26 formed with and extending from the sides of the arch member legs. A bushing 27 is arranged around the stub axles intermediate a pair of the bearings and a thrust washer 28 is placed around the axles above the bushings. The stub axles are provided with similarly spaced adjustment holes 29 and a pin 30 extends through each bushing 27 and a hole in the associated stub axle to position the axles vertically in desired relation with the implement frame. It is obvious that several vertical adjustments of the axles relative to the frame can be provided for. A foot rest member 31 is formed integral with each bushing 27, and they extend inwardly and rearwardly. The foot rests are connected by the rod 32 which is secured at each end of bolts 33. Rotation of the axles is prevented and stationary position of the foot rests is obtained by locking links 34 which are secured at one end to bosses 35 formed with and extending upwardly from the legs of the arch member.

A tool carrier structure is supported by the frame hereinbefore described. Side bars 36 are pivoted at their forward ends preferably to the lower frame beams by the bail 37, and they extend rearwardly adjacent the frame beams and project through the slots 21 in the arch legs. A bracket 38 is secured to each of the pivoted beams and each is suspended by a link 39 from a lever arm 40 which extends rearwardly from the upper end of each of the arch legs, being pivoted by bolts 41 to arcuate rack members 42 extending from the arch. The arcuate rack members 42 are secured at their upper end to a leg of the arch member by the bolts 41 and are secured at their lower ends in a recess in the legs by welding, the racks extending in a plane so that pawls 44, operated by rods 45 and hand members 46 associated with the lever arms, can engage with the teeth thereon when the arm 40 is moved vertically. It will be seen that by moving the lever arms vertically, after the pawls have been released, links 39 will be raised or lowered and thus the pivoted bars can be readily elevated or lowered into desired relation independently of the frame and locked by the pawls 44 engaging the rack members 42.

A bail 47 extends between the rear ends of the pivoted side bars 36 and forms a part of the tool carrying structure. The bails 37 and 47 support the tool carrying beam 49 and are arranged so that they always move in equal arcs, being retained with the associated bars by cotter pins 43. When the lever arms 40 are adjusted they will raise or lower the associated side bars so that when in similar position with the rack bars 43, the bails will move in unison and in parallel relation to each other, but when one lever is moved differently than the other then the associated bar will be adjusted accordingly, thus tilting the rear bail transversely of the frame.

The bails are arranged to carry the beam 49 to which a tool 50 is secured, the illustrated tool being a plow, but it will be understood that any form of tool can be carried by the beam. One section of a rear clamp member 51 is secured to the beam 49 by bolts 52, while the other section 53 of the clamp member is secured to the first clamp section by bolts 54, the clamp sections having recesses in their adjacent faces for the reception of the bail 47. This clamp member secures the beam rigidly with the bail 47. The forward end of the tool beam is rockably attached to the bail 37 to permit arcuate movement of the tool and its beam, that is, sidewise or lateral rocking. A pair of clamp members 55 and 56 are secured together by bolts 57, the clamp member 55 being secured to the tool beam. The adjacent faces of the clamp members have an arcuate groove 80 formed therein to receive the bail 37, thus permitting side tilting of the clamp member relative to the bail 37. The clamp member 55 is formed as a casting with a rearwardly extending arm 81 which is bifurcated at its rear end to receive the forward end of the tool beam 49. A wooden pin 82 extends through holes in the bifurcated arm and the beam, and another pin 83 extends through the beam and the slotted end of the arm 81. The wooden pin will break under conditions where the plow encounters too severe resistance and the beam 49 and pin 83 will move rearwardly from the arm 81, thus preventing breaking of the tool or the implement.

With the described manner of attaching the tool beam to the carrier structure, by raising or lowering the lever 40 relative to the corresponding one, the beam and tool will be cocked sidewise so that the angle of the tool wing can be arranged in a desired angular plane, in other words the soil can be sheared at any angle desired. It will be seen that this adjustment will be made independently of the implement frame, that is, will not change the plane in which the frame lies in any respect, and that the adjustment can be readily made by the operator from his seat on the implement while the implement is in progress. It is not necessary to stop the implement or to cock the frame, causing the operator to sit at an angle, to make the adjustment. This simple form of adjustment is one of the features of my invention and provides a very desirable improvement over the present methods in which the implement must be stopped and then fastening means removed and applied before and after manual change.

I also provide a simple mechanism for bodily elevating or lowering the tool without affecting the position of the frame, and this adjustment can also be quickly made while the implement is in operation. This same mechanism is also utilized for varying the suck angle of the tool. With such mechanism the tool can be maintained in desired cutting depth and at the desired suck angle, and furthermore each of the various adjustments can be made without interfering with the other positions of tool adjustment.

A pair of coil springs 59 are provided to normally move the bails and the attached tool to an upper position where the tool will clear the ground. One end of the springs is fastened to the sides of the bail 37 by eyebolts 60, while the other end of the springs extend upwardly and are secured to plates 61 which are attached to the forward end of the upper frame beams 10 by bolts 62.

A link member 63 is pivotally attached to the tool beam 49 and extends upwardly and is pivoted to the rack segment 64 which is pivotally secured to an inverted bracket 65 by a bolt 66. The bracket includes two arms which extend upwardly from the upper frame beams and are rigidly secured thereto by the rivets 67. The rack segment 64 is provided with a bifurcated terminal 68 through which the bolt 66 passes and is arranged to receive an operating member 69, the upper end of which is formed as a hand grip and the lower end 70 of which is formed as a foot stirrup. The operating member 69 is retained with the rack by means of the set screw 71, and the position of the operating member can be adjusted through the provision of a plurality of holes therebetween for the reception of the bolt 66. Such adjustment is provided for so that the stirrup can be regulated to suit the operators. A bracket 72 is secured on one of the upper beam members for carrying a pawl 73 which is pressed toward the toothed segment 64 by a coil spring 74. The pawl swivels in the bracket and extends across the toothed segment so that the extended end 75 can be kicked away from engagement with the segment to permit the tool beam to drop to its lowermost position which is operating position. Through this mechanism the tool beam can be bodily raised or lowered, and the depth of the tool cut can be maintained through the engagement of the pawl 73 with the segment. It will be seen that through means of the link 63 the tool beam position is dependent upon the relation of the segment 64, and that lifting is accomplished through manually pushing the lever 69 forward.

In order to regulate the maximum cutting depth of the tool, the arch member legs are provided with bosses 76 in which stop screws 77 are adjustable. The stop screws 77 are arranged in a plane under the bail 37 so that they will stop the downward movement of the bail and thereby that of the tool.

It will be seen that I have provided an implement upon which the operator can ride comfortably and also readily make the several adjustments for a suitable arrangement of the tool for the ground conditions or type of work desired, and while the implement is in progress. Adjustment can be made to vary the suck angle of the tool, adjustment can be made to vary the wing angle of the tool laterally, adjustment can be made to bodily arrange the tool to work at various depths and lifting of the tool and return to working position can be readily accomplished. Further, if the frame is arranged for a high clearance, it will tilt forwardly because of the stationary drawbar attachment and under these circumstances the tool can be adjusted to desired horizontal plane. To summarize the invention, it may be described as an implement in which there is a universal joint connection of the tool and its carrier with the frame, so that without disturbing the position of the frame various tool angles and positions can be obtained, and while the implement is in progress. It will be further observed that all adjustments can be made without disturbing the other adjustment settings, for instance, the vertical angle of the tool can be adjusted, or the suck angle of the tool can be adjusted, or the tool can be bodily raised or lowered, each without disturbing the other.

The ease of adjustment and the various adjustments which can be made save the operator time and inconvenience, and prolong the life of both the implement and the tractor, if one is used as the motive power, because the tool can be adjusted to relieve strains when ground conditions are encountered which would place severe strains upon the apparatus.

The suck angle of the tool is adjusted through similarly raising or lowering both the beams 36. The wing angle of the tool is adjusted through raising or lowering one of the beams 36 relative to the other. The depth of the tool operation is changed through the adjustment of the segment 64. The tool can be elevated by forward movement of the foot lever 70 moving the segment 64 and can be dropped into operative position in the ground through gravity upon release of the pawl 73. The lowermost position of the tool is determined by the stop members 77 which limit the downward movement of the bail 37 when the tool is released for operating position.

The term "suck angle", as used herein, refers to the angle at which the bottom surface of the tool is related to an assumed level surface thereunder. The point or toe of the tool is pointed downward so that the bottom surface of the tool is inclined at its forward end to the ground. The term "wing angle" used herein refers to the angle at which the wing of the tool extends relative to an assumed level surface beneath the same, and such angle can be varied by side tilting of the beam to which the tool is rigidly secured. The beam is carried by a front bearing on the front bail in a manner to permit a vertical movement, and a pivotal movement in the direction of the bail axis, thus allowing side tilting of the beam or vertical tilting thereof. The side tilting is accomplished by adjusting the links 63 relatively thus changing the tool wing angle, while the tool suck angle can be varied by adjusting the links 63 in the same manner to vertically change the longitudinally tilted position of the beam.

Various changes can be made in the structure described without departing from the spirit of the invention or the scope of the appended claims.

Having described my invention, what I claim is:—

1. In an implement, a wheeled frame, a bail pivotally attached to the frame, a pair of side bars pivotally attached at one end to the bail, another bail carried by the rear portion of said side bars, a plow beam carried by the bails and vertically adjustable means for supporting the rear ends of the side bars.

2. In an implement, a wheeled frame having upper and lower pairs of beams rigidly secured together, a bail pivotally secured across the lower beams, a pair of side bars pivoted to said bail, another bail carried by said side bars, an earth working tool secured to the bails, means for vertically tilting the side bars independently, and means for elevating and lowering the beam.

3. In an implement, a wheeled frame including an arch member, bosses extending from the arch member legs, wheel axles extending through the bosses, a bearing intermediate the bosses on each leg and attached to the axles to prevent vertical displacement thereof, and stirrups integral with the bearings.

4. In an implement, a wheeled frame including an arch member having bosses on the legs thereof, axles projecting through the bosses, stirrup members secured to the axles and associated intermediate the bosses on the legs of the arch member to secure the axles vertically with the frame, a rod connecting the stirrups, and means securing the rod in fixed relation with the frame.

5. In an implement, a wheeled frame including an arch member, a tool carrier structure supported by the frame and adjustable vertically, and bolts adjustable in the arch member, said bolts being engaged by the carrier structure to limit the downward movement thereof.

6. In an implement, a wheeled frame comprising an arch member having slotted legs, a pair of upper beams rigidly secured to the top of the arch member, a pair of lower beams extending into the slots in the arch member legs, and means securing the lower beams rigidly to the arch member.

7. In an implement, a pair of upper beams, a pair of lower beams, an arch member to which the upper and lower pairs of beams are rigidly secured, the legs of the arch member being slotted, a pair of side bars extending through the slots in the arch member legs, a bail securing the forward end of the side bars with the lower beams, a rear bail secured to the rear ends of the side bars, an earth working tool carrying beam connected to the bails, means for raising and lowering the tool carrying beam and means carried by the arch member for suspending the rear ends of the side bars.

8. In an implement, a carrier structure comprising spaced bails, a tool carrying beam extending longitudinally of the bails, means for securing the beam rigidly to one bail, and means connecting the beam to the other bail, said means being vertically and axially tiltable relative to the bail.

9. In an implement, a carrier structure comprising spaced bails, a tool carrying beam extending longitudinally of the beams, a rear clamp member rigidly securing one end of the beam to a bail, and a front clamp connecting the beam to the other bail, said front clamp having a groove therein for permitting lateral tilting relative to the associated bail.

10. In an implement, a wheeled frame, a front bail carried by the frame, side bars pivoted to said bail, another bail carried by the rear ends of the side bars, a tool carrying beam secured to the bails, and manually adjustable means suspending the rear ends of the side bars from the frame.

In testimony whereof, I have hereunto subscribed my name this 20th day of March, 1929.

GEORGE DOUGLAS JONES.